UNITED STATES PATENT OFFICE.

EVALENA O. LEGGETT, OF NIAGARA FALLS, NEW YORK.

INSULATING COMPOUND.

1,005,240.

Specification of Letters Patent.

Patented Oct. 10, 1911.

No Drawing.

Application filed January 30, 1911. Serial No. 605,503.

*To all whom it may concern:*

Be it known that I, EVALENA O. LEGGETT, a citizen of the United States, and a resident of Niagara Falls, in the county of Niagara and State of New York, have made certain new and useful Improvements in Insulating Compounds, of which the following is a specification.

My invention relates to insulating compounds, and is more especially adapted to the insulation of electric wires or cables, and it consists in the following named ingredients.

An object of my invention is to provide first of all a compound which will act as a perfect insulator.

A further object of my invention is to provide a compound which is unaffected by ordinary variations of temperature.

A further object of my invention is to provide a compound which can be applied after the manner of paint, which will dry quickly and will not crack or chip off.

A further object of my invention is to provide a waterproof compound which will not "sweat".

Other objects and advantages will appear in the following specification and the novel features of the compound will be particularly pointed out in the appended claims.

My compound may be made by following out other processes than the one to be described. It will be understood, therefore, that the following statement of the method of manufacturing my compound is merely illustrative of the proportions used and of the manner in which the ingredients are brought together, and the specific example given hereinafter is only one of a number of ways of forming the compound, each one of which I would regard as being within the spirit and the scope of the invention.

In carrying out my invention, I may take six ounces of red gum, which I dissolve in approximately two quarts of alcohol. This I term solution No. 1. For solution No. 2, I dissolve 1½ pounds of gamboge in two quarts of alcohol. Three pounds of asphaltum is then dissolved in about three pints of Venice turpentine. In order to do this, the asphaltum must be heated in the turpentine until thoroughly dissolved. This, I will term solution No. 3. Solution No. 4 is made by treating nine ounces of lac seed with about two fluid ounces of sulfuric acid. This forms a jelly-like mass which may be diluted with alcohol to the consistency of a varnish, an ounce or two of turpentine being added.

In order to get the best results, I take solution No. 3 containing asphaltum, while it is still warm, and add to it solutions Nos. 1 and 2, stirring meanwhile until the product is of a thick semi-fluid nature. Solution No. 4 is then added, and the resulting product which is too thick to be worked with a brush is then thinned with ordinary turpentine. The method thus described makes about three gallons of fluid insulating compound, having the consistency of ordinary varnish.

The compound thus described is particularly useful in the insulation of electric wires. Thus it can be used in place of other insulating compounds which are more expensive, and which are subject to certain influences which do not affect the composition which forms the subject of the present application. The compound is applied in the ordinary manner with a brush, or the articles may be dipped into it. The compound dries quickly, and after it is dry, it is not sticky or gummy. A relatively high heat will not affect it, that is, it will stand a high heat without melting. It will also stand severe cold without any apparent change, where other insulating compounds will crack when applied to fabric or when applied to the metal itself, without the use of fabric. It may be bent without cracking or chipping.

One of the important features of the composition is its perfect insulating qualities. It has been tested under high voltages, without permitting any of the current to escape. Another important feature is that it does not "sweat". Some varnishes of this nature give up sufficient water to cause the rusting of the metals to which they are applied. It adheres well to metals and to fabric, and is waterproof, not being affected by exposure to the elements.

As stated above, the example given is one of many ways in which this compound may be made, but I have found by experiment that the proportions named produce a compound having better qualities than if made up in proportions which vary materially from those stated.

I claim:—

1. An insulating compound comprising lac seed, gamboge, red gum, asphaltum,

Venice turpentine, sulfuric acid, ordinary turpentine, and alcohol.

2. An insulating compound comprising the following ingredients in approximately the proportions specified, to wit: lac seed, nine ounces; gamboge, a pound and a half; red gum, six ounces; asphaltum, three pounds; Venice turpentine, three pints; sulfuric acid, two fluid ounces; alcohol, one pint; and sufficient turpentine to make three gallons of the product.

EVALENA O. LEGGETT.

Witnesses:
L. A. STANLEY,
SOLON C. KEMON.